United States Patent [19]

Cooper

[11] Patent Number: 4,841,570
[45] Date of Patent: Jun. 20, 1989

[54] ONE-WAY TRANSFORMATION OF INFORMATION

[75] Inventor: James A. Cooper, Albuquerque, N. Mex.

[73] Assignee: The United States of America as represented by the United States Department of Energy, Washington, D.C.

[21] Appl. No.: 48,433

[22] Filed: May 11, 1987

[51] Int. Cl.$^4$ ............................................. H04K 1/00
[52] U.S. Cl. ........................................ 380/30; 380/50
[58] Field of Search ........................ 380/28, 30, 50, 49

[56] References Cited

U.S. PATENT DOCUMENTS

| | | | |
|---|---|---|---|
| 4,100,374 | 7/1978 | Jayant et al. | 380/28 |
| 4,218,582 | 8/1980 | Hellman et al. | 380/30 |
| 4,306,111 | 12/1981 | Lu et al. | 380/30 |
| 4,351,982 | 9/1982 | Miller et al. | 380/30 |
| 4,375,579 | 3/1983 | Davida et al. | 380/28 |
| 4,514,592 | 4/1985 | Miyaguchi | 380/30 |
| 4,567,600 | 1/1986 | Massey et al. | 380/21 |
| 4,633,036 | 12/1986 | Hellman et al. | 380/30 |
| 4,658,094 | 4/1987 | Clark | 380/28 |
| 4,736,423 | 4/1988 | Matyas | 380/30 X |

FOREIGN PATENT DOCUMENTS

| | | | |
|---|---|---|---|
| 0105553 | 4/1984 | European Pat. Off. | 380/29 |
| 0199620 | 10/1986 | European Pat. Off. | 380/28 |
| 0218305 | 4/1987 | European Pat. Off. | 380/30 |
| 0241333 | 11/1985 | Japan | 380/28 |

Primary Examiner—Stephen C. Buczinski
Assistant Examiner—Bernarr Earl Gregory
Attorney, Agent, or Firm—George H. Libman; James H. Chafin; Judson R. Hightower

[57] ABSTRACT

Method and apparatus are provided for one-way transformation of data according to multiplication and/or exponentiation modulo a prime number. An implementation of the invention permits the one way residue transformation, useful in encryption and similar applications, to be implemented by n-bit computers substantially with no increase in difficulty or complexity over a natural transformation thereby, using a modulus which is a power of two.

22 Claims, 6 Drawing Sheets

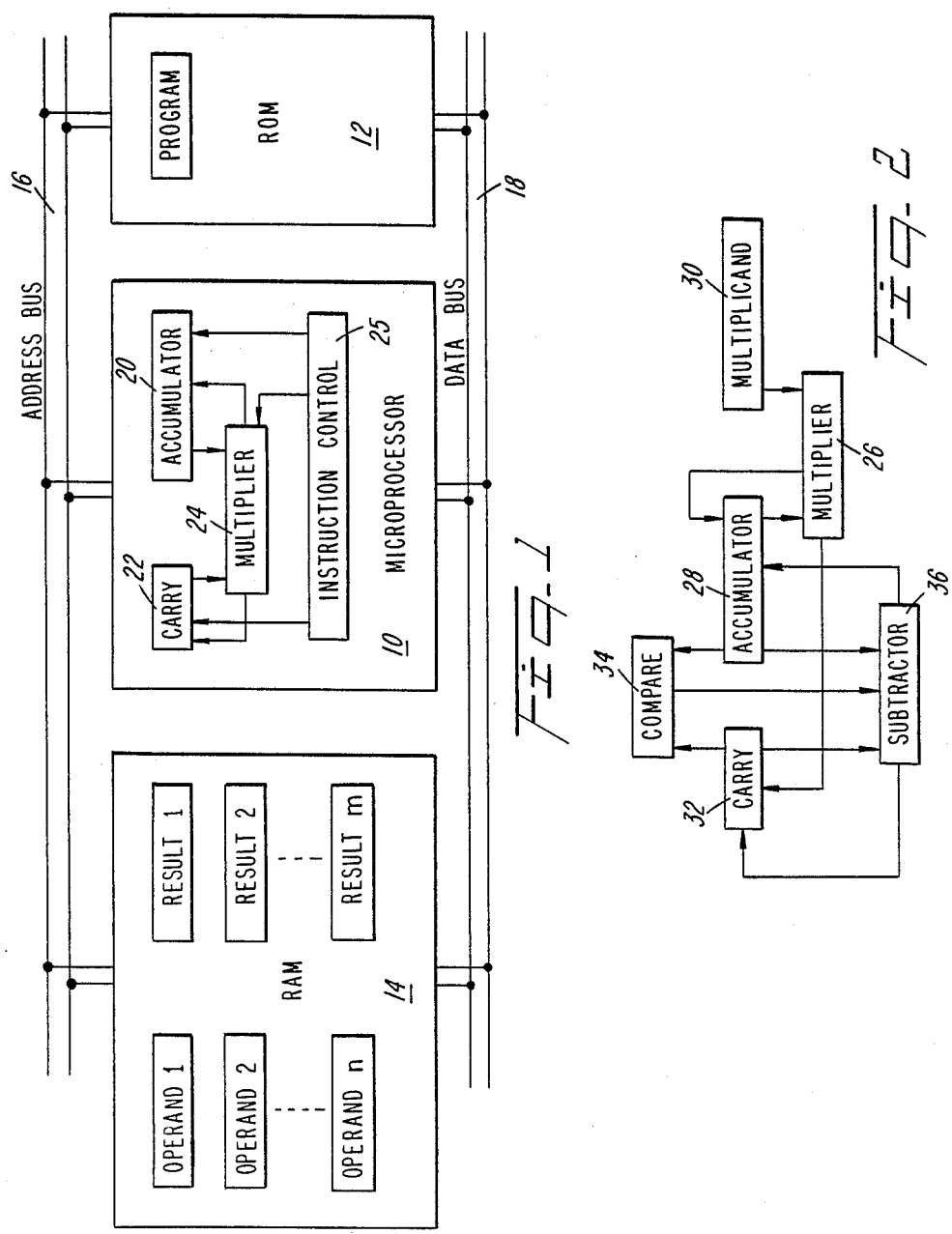

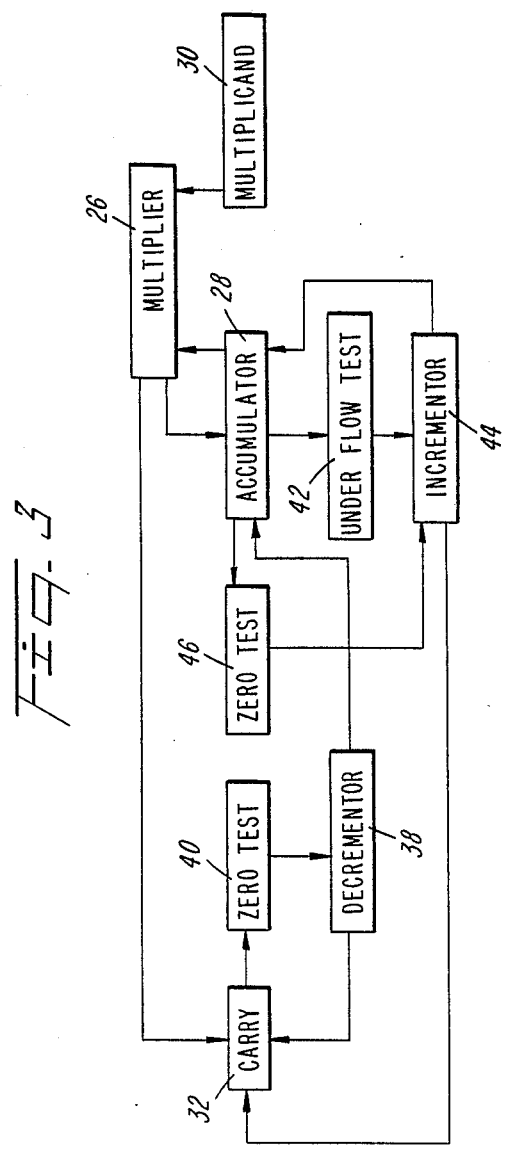

C = CARRY
A = ACCUMULATOR
C' = NEXT CARRY
A' = NEXT ACCUMULATOR

MESSAGE BIT SEQUENCE POLYNOMIAL, b(X)

COMPARE r(X) WITH REFERENCE VALUE

ONE-WAY TRANSFORMATION OF INFORMATION

The U.S. Government has rights in this invention pursuant to Contract No. DE-AC04-76DPO0789 between the U.S. Department of Energy and AT&T Technologies, Inc.

TECHNICAL FIELD

This invention relates to transformation of information, of a type used in devices for encryption of data, and more particularly to an improvement in devices and methods for obtaining modulo-k products on n-bit computers. A particular aspect of the invention relates to method and apparatus for obtaining modulo-k products where k is a prime number of a type $2^p \pm d$ using an n-bit computer, where $p \leq n$.

BACKGROUND ART

One-way transformations have been studied for a variety of possible application, including encryption, authentication, information coding, computer password protection, and unique signal monitoring in weapon systems.

Briefly, a one-way transformation is easy to accomplish, but difficult to invert. A more complete definition is as follows:

a one-way transform, or function, f, is a function such that for any argument x in the domain of f, it is computationally straightforward to compute $y=f(x)$, but for almost all y in the range of f, it is computationally difficult to compute x determinstically. That is, it is difficult to obtain the inverse transform of y.

Ease and difficulty can be measured in terms of computational requirements in time and equipment.

The one-way function definition specifies that deriving x from y must be computationally difficult for almost all y. This means that for a transform to be useful, it need not depend on 100 percent noninvertibility. It is quite possible that a transform would be used in such a way as to avoid the cases for which it was known to be invertible. For an example, the inverse of exponentiation is relatively difficult in general (e.g., using logarithms), but for some cases (e.g., squaring) the inverse is solvable by simple functions.

A final elaboration is necessary because of the last word in the definition, "deterministically." This accounts for a common extension of the reference usage to allow for inversion difficulty based on a large population being mapped to a small population. Thus, a many-to-one mapping may inhibit inversion (even though the inversion is straightforward) if the potential population for x is large. Thus, $x_1$ is the input to the transformation, but $f(x_1)=y=f(x_i)$, where $x_i$ represents a large population in addition to $x_1$.

One-way transformations are thus applicable in various fields, including encryption, message authentication, PIN protection, password protection and accident protection, for example.

In encryption the transformation is generally used to disguise information; the inversion difficulty is relied upon to prevent cryptanalysis. An intended recipient of the information must, however, be readily able to perform the inversion. This is accomplished by privileged knowledge (such as decryption key or analogous "trap-door" information). Applications of message authentication include electronic banking transactions, which commonly carry a relatively short "authenticator" that is a transformation dependent on the entire transaction. The intent is to easily create an authenticator, but to make it difficult to deduce (short of trial and error) any other data/authenticator pairs. This discourages tampering with the data. In this case, the transformation must be protected from an adversary.

Encryption, or transformation, is also used in PIN protection. Bank cards usually carry encoded PINs on the magnetic stripe of the card in order to permit "off-line" use when the central computer is unavailable. Both secrecy and authentication are desirable. Knowing the contents of the magnetic stripe should not reveal the PIN or any other PIN/authenticator pair. When a PIN is entered at a ATM (Automatic Teller Machine), it is encoded for comparison with the encoded representation on the magnetic stripe.

Password protection is yet another application of encryption techniques. Computers with password access control must represent the passwords in a database. It is desirable to encode the passwords because of possible exposure to operators, service personnel, systems programmers, etc. One-way transformations allow comparison of encoded passwords for authentication but inhibit obtaining of clear-text passwords from the encoded passwords.

Still another application of transformation technology is for accident protection. One-way transformations have been used in weapons program to protect data that might cause critical weapon functions to occur during an accident. The one-way nature of the transformation protects against accidental generation of functional data, while enabling checks of the functional data for accuracy.

A number of different transform techniques are known. Mathematical structure is important to assure unique transformations. Thus, polynomial transformations and matrix transformations provide one type of unique transformation. A common type is represented by transformations over what is known mathematically as a Galois field, denoted by GF(p). Such transformations are represented by mathematical functions, such as addition, multiplication or exponentiation, performed modulo the integer p, where p is a prime number or a power of a prime number.

Exclusive-or addition (modulo-2 addition) is used to provide a common implementation of a transformation over the field GF(2). A logical AND operation, equivalent to a modulo-2 multiplication, may be an associated transformation over the field GF(2), frequently used in combination with GF(2) addition.

Hardware implementation of each of these functions is well known. For example, GF(2) computations and transformations are well suited for implementation by available hardware. Such hardware is typically incorporated in microprocessor and computer devices, thus enabling computers to perform appropriate computations over the field GF(2).

Indeed, as shown in the following paragraphs, typical n-bit microprocessors and computers are inherently capable of performing non-unique transformations modulo $2^n$ (although unique transformations over fields are more difficult).

For example, in a multiplication operation, when the multiplication results in more digits than the accumulator word length, the extra digits are stored in a carry register, storing a carry word denoted as c:

$$c = c_{n-1}, c_{n-2}, \ldots, c_0.$$

The numeric value of the carry word, n, is:

$$n_c = 2^n(c_{n-1}2^{n-1} + c_{n-2}2^{n-2} + \ldots + c_0)^c = t(2^n).$$

If the carry word were discarded, the value subtracted from the product would be $n_c$, resulting in multiplication modulo $2^n$. Indeed, in an n-bit computer (having-n bit words) discarding the q most significant bits of a word, i.e., truncating the q most significant bits, results in a modulo $2^{n-q}$ representation of the word.

An n-bit computer is thus inherently capable of providing straightforward modulo $2^k$ representations of the data therein, for $k = 1, \ldots, n$.

However, it is frequently desirable to obtain a more complex encryption than is available in the field GF(2). Indeed, it is desirable to obtain modulo-p transforms of data, wherein p is preferably a prime number. However, with the exception of the trivial case $p = 2$, it is generally appreciated that substantial difficulty is associated with obtaining modulo-p transformations where p is a prime number.

It is accordingly an object of the present invention to overcome the difficulties of the prior art and to provide method and apparatus for obtaining a representation of data modulo a prime number which is not much more difficult than representing the data modulo a power of 2.

It is also an object of the invention to provide method and apparatus for efficient transformation of data over a Galois field GF(p) where p is not necessarily a power of 2.

It is a more specific object of the invention to provide an efficient method and apparatus for encryption of data by transformation over a Galois field GF(p) where p is a prime number.

Another object of the invention is the provision of method and apparatus for obtaining products of two or more numbers modulo a prime number.

Still an additional object of the invention is the provision of method and apparatus for exponentiation of two or more numbers modulo a prime number.

It is a further object of the invention to overcome an inherent mismatch between microprocessor computations and residue algebra involving modulo arithmetic and more specifically to obtain a residue modulo p for products obtained by multiplication in an n-bit processor, where p is not equal to a power of 2.

Other objects, features and advantages of the present invention will become readily apparent to those skilled in the art from the following description wherein there is shown and described a preferred embodiment of the invention, simply by way of illustration and not of limitation of one of the best modes (and alternative embodiments) suited to carry out the invention. As will be realized upon examination of the specification and from practice of the same, the present invention is capable of still other, different, embodiments and its several details are capable of modifications in various obvious aspects, all without departing from the invention. Accordingly, the drawings and the descriptions provided herein are to be regarded as illustrative in nature and not as restrictive of the invention.

DISCLOSURE OF INVENTION

In accordance with these and other objects of the invention, there is provided a method for one-way transformation of data to generate an encrypted form thereof by obtaining a modulo-k representation of a product of two numbers, G and H, in an n-bit computer where $2^n \neq k$. The computer may have a multiplying apparatus which includes an n-bit accumulator register and an n-bit carry register. The inventive method includes the steps of inputting a first number G from an input source to the computer, and obtaining a second number H. The multiplying apparatus is used to obtain a product $J = G*H$, which product is stored in the accumulator and carry registers. The product is transformed to obtain a unique one-way encrypted transform thereof.

According to the invention, the transforming step includes obtaining a modulo-k representation, $J_k = (G*H) \bmod k$, of the product by testing the contents of the accumulator and carry registers to determine a relation therebetween, selecting a function dependent on the results of the test, performing the selected function on the contents of the carry register, and altering the accumulator register in response to the signals transferred thereto. Signals are generated representative of the altered contents of the accumulator register. The signals are output as the transformed representation, $J_k$.

Preferably, the number k differs by an integer d from a power of two, $2^p$. If $n > p$, n-p bits of the accumulator and carry registers are disabled.

In one situation, the number k is greater than the power of 2 by the integer d. In this case, the selecting step includes selecting a decrementing function to be performed. Thus, the altering step includes the step of decrementing the accumulator and carry registers until the contents of the carry register are zero, thereby subtracting the contents of the carry register from the contents of the accumulator register.

When $n = p$ and the number k is a prime number one more than $2^n$, the testing step includes the step of testing the contents of the accumulator and carry registers to determine which register contains a larger number. If the contents of the accumulator register are greater than or equal to the contents of the carry register the selecting and generating steps include the step of generating signals representative of the contents of the carry register. On the other hand, if the contents of the carry register are greater than or equal to one more than the contents of the accumulator register, the selecting and generating steps include the step of generating signals representative of a number one less than the contents of the carry register. In that event, the altering step includes the step of decrementing the accumulator register, thereby subtracting one less than the contents of the carry register from the contents of the accumulator register.

In another situation, the number k is less than the power of 2 by the integer d and the selecting step includes selecting a combined incrementing and decrementing function. In that event, the altering step includes the step of incrementing the accumulator register while decrementing the carry register until the contents of the carry register are zero, thereby adding the contents of the carry register to the contents of the accumulator register. For such a situation, where $p = n - t$ (t an integer) and the number k is a prime number one less than $2^p$, the testing step includes the step of testing the contents of the accumulator and carry registers to determine whether a sum of the contents is or is not less than k and, if the sum is not less than k, the accumulator register is incremented upon noting an overflow when the contents of the carry register are zero.

According to the invention, the step of using the multiplying apparatus to obtain a product may include the step of obtaining a exponential product of the two numbers.

In an alternate form of the invention, there is provided a method for encrypting data by obtaining a truncated modulo-k representation of an exponential product of first and second numbers, G and H, in an n-bit computer where $2^n \neq k$, the computer having a multiplying apparatus including an n-bit accumulator register and an n-bit carry register. In this form, the invention includes the steps of using the multiplier to obtain an exponential product $J = G^H$ of the first and second numbers.

A truncated portion of the exponential product is stored in the accumulator and carry registers and is transformed to obtain a unique one-way encrypted transform thereof. The transforming step includes obtaining a modulo-k representation, $J_k = (G^H) \bmod k$, of the exponential product by performing the following steps. The contents of the accumulator and carry registers are tested to determine a relation therebetween. A function is selected, dependent on the results of the testing step, and the function is applied to the contents of the carry register. Signals are generated representative of the selected function of the contents of the carry register, and the generated signals are transferred to the accumulator register.

The accumulator register is altered in response to the signals transferred thereto and signals representative of the altered contents of the accumulator register are generated and outputted as the transformed representation $J_k$.

As for the first form of the invention, the number k preferably differs by an integer d from a power of two, $2^p$, and n−p bits of the accumulator and carry registers are disabled when n > p. The number k may be greater than or less than the power of 2 by the integer d, and the selecting step accordingly includes selecting a decrementing function or a combined decrementing and incrementing function. The altering step and the proper tests are appropriately performed, as described for the first form of the invention.

According to yet another aspect of the invention, there is provided apparatus for one-way transformation of data to generate an encrypted form thereof as a modulo-k representation of a product of first and second numbers in an n-bit computer, where $2^n \neq k$, the computer having a multiplying apparatus including an n-bit accumulator register and an n-bit carry register. The inventive apparatus includes means for inputting first and second numbers G and H to the multiplier to obtain a truncated product $J = G*H$ in the accumulator and carry registers. The multiplier may, in fact, be an exponentiating device.

The computer includes modulo residue generating means for obtaining a modulo-k representation, $J_k = (G*H) \bmod k$, of the product. The residue generating means includes a testing means for testing the contents of the accumulator and carry registers to determine a relation therebetween, a selecting means for selecting a function dependent on the results of the testing step, and an applying means for applying the selected function to the contents of the carry register.

First signal generating means is provided for generating signals representative of the selected function of the contents of the carry register. Transferring means is provided for transferring the generated signals to the accumulator register, and altering means is included for altering the contents of the accumulator register in response to the signals transferred thereto. Second signal generating means is used for generating signals representative of the altered contents of the accumulator register and outputting means is provided for outputting the signals representative of the altered contents of the accumulator register as the modulo-k representation $J_k$.

The disclosed apparatus functions to perform the inventive method as hereinabove described, particularly in situations wherein the number k differs by an integer d from a power of two, represented by $2^p$. Disabling means is operable (when n > p) for disabling n−p bits of the accumulator and carry registers.

The number k may be greater or less than the power of 2 by the integer d, the selecting means being operable for selecting a decrementing function or a combined decrementing and incrementing function accordingly. The altering means preferably includes decrementing means, operable when the number k is greater than the power of two, for decrementing the accumulator and carry registers until the contents of the carry register are zero, thereby subtracting the contents of the carry register from the contents of the accumulator register. Thus, the testing means includes means for testing the contents of the accumulator and carry registers, when n = p and the number k is a prime number one more than $2^n$, to determine which register contains a larger number.

If the contents of the accumulator register are greater than or equal to the contents of the carry register, the first generating means is operable for generating signals representative of the contents of the carry register. However, if the contents of the carry register are greater than or equal to one more than the contents of the accumulator register, the first generating means is further operable for generating signals representative of a number which is one less than the contents of the carry register.

For situations when the number k is less than the power of 2 by the integer d, the selecting means is operable for selecting a combined incrementing and decrementing function. The altering means includes means for incrementing the accumulator register while decrementing the carry register until the contents of the carry register are zero, thereby adding the contents of the carry register to the contents of the accumulator register.

In that regard, for situations wherein $p = n - t$ (t an integer) and the number k is a prime number one less than $2^p$, the testing means includes means for testing the contents of the accumulator and carry registers to determine whether a sum of the contents is or is not less than k and, if the sum is not less than k, for incrementing the accumulator register upon noting an overflow when the contents of the carry register are zero.

BRIEF DESCRIPTION OF THE DRAWING

The accompanying drawings illustrate a preferred embodiment of the invention, wherein:

FIG. 1 shows a memory based implementation of the invention;

FIGS. 2 and 3 show register based implementations of the invention, with interconnections to arithmetic functional units;

BEST MODE FOR CARRYING OUT THE INVENTION

Figure 4:
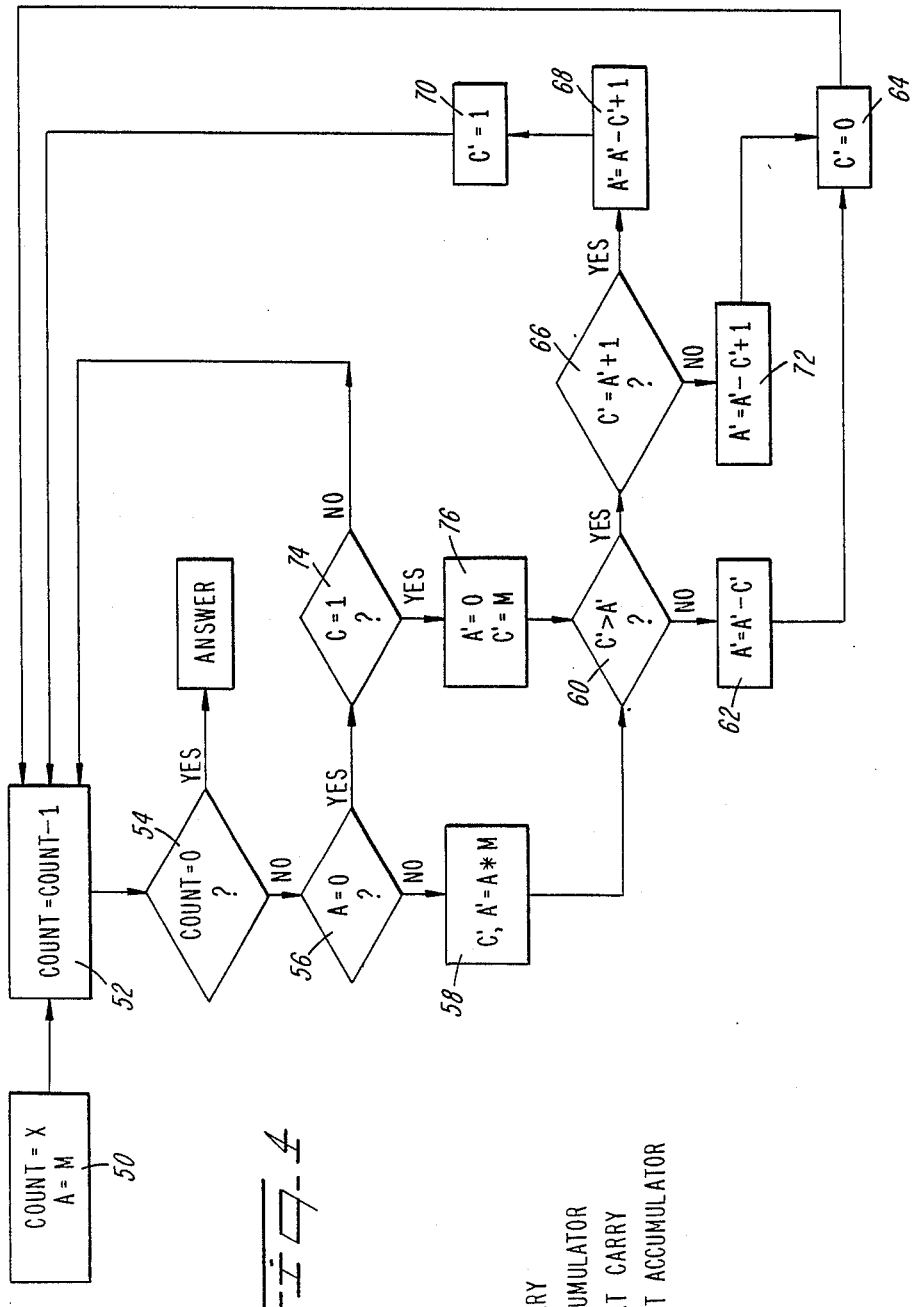
FIG. 4 is a flow chart illustrating operation of a microprocessor in the embodiment of FIG. 1.

In accordance with the present invention, there is provided method and apparatus for efficiently obtaining a modulo-p residue of a computation, with particular emphasis on the product or exponentiation of two numbers, without necessarily carrying out exponentiation (or multiplication) to full precision. More specifically, the following disclosure describes a method and apparatus for encrypting, or encoding, data utilizing an essentially unique one-way transform wherein data words are transformed to modulo p residues by n-bit computers essentially as easily as a natural transformation using moduli which are powers of 2.

As hereinabove described, n-bit computing devices which automatically truncate data to the n-bit word length effectively provide modulo $2^n$ conversions. The present invention relates to the performance of similar modulo-arithmetic, wherein the modulus p is a prime number, instead of a power of 2.

As known to those skilled in the art, a transformation done in a ring instead of a field is not unique. For example, $2^2 \pmod 6 = 4^2 \pmod 6 = 4$.

More particularly, in order to obtain a unique transformation a prime number should preferably be used as the modulus. For standard word length computers, having word lengths such as 4, 8 or 16 bit word lengths, as well as for 32 and 64-bit computers, multiplication can readily be performed modulo $2^n$ (where n is the processor word-length) by truncating the result to the word length. The present invention permits performing arithmetic computations including multiplication generally, and exponentiation particularly, modulo prime numbers such as 5, 17, 257, 65537, and others.

Indeed, for k=2, 4, 8 or 16, it is known that $2^k + 1$ is a prime number. Specifically, the above noted prime numbers 5, 17, 257 and 65537 are $2^2+1$, $2^4+1$, $2^8+1$ and $2^{16}+1$, respectively. It is also known that some prime numbers are related to powers of 2 as being one less than the power. Specifically, prime numbers are found at one less than powers of 2 in the vicinity of k=32 or 64. For example, $2^{31}-1$ and $2^{61}-1$ are both prime numbers.

As has been previously described herein, computers of word length n are capable of naturally obtaining modulo $2^m$ residues for m<n. Thus, $2^{31}$ and $2^{61}$ "natural" moduli for 32 bit and 64 bit machines, respectively. With the present invention, modulo arithmetic can be performed for (prime number) moduli such as $2^8+1$, $2^{31}-1$ and $2^{61}-1$ virtually as easily as for moduli which are powers of 2. However, the resulting transformation is unique for the prime number moduli but not for the power-of-two moduli.

Although the preceding examples, as well as the following disclosure, identify application of the invention to moduli which are one count different from a power of two, it will be recognized that the disclosed concepts are applicable to moduli which differ from a power of two by any integer $d \geq 1$.

It will be recalled from the previous description herein that a computer or microprocessor naturally obtains a modulo $2^n$ residue by discarding the contents of the carry register, $n_c$, which may be expressed as $t(2^n)$.

In order to obtain a residue of a product (or exponentiation) modulo $2^n + 1$, where n is the word length of the computer, it is necessary to discard an additional count from the product each time $2^n$ is discarded, with the exception of certain "boundary conditions" described hereinbelow. Inasmuch as in the natural residue operation (modulo $2^n$) performed by truncating, or discarding, the contents of the carry register the quantity $2^n$ is discarded $$t = c_{n-1}2^{n-1} + c_{n-2}2^{n-2} + c_{n-3}2^{n-3} + \ldots + c_o$$

times, the number of additional counts to be discarded from the product to obtain a modulo $2^n + 1$ residue is given by the contents of the carry register. To discard this count from the product, it is sufficient to discard the count from the accumulator in addition to discarding the carry word. Similarly, subject to similar "boundary conditions", in order to obtain a residue modulo $2^n - 1$, it is necessary to add a count to the product for each time the quantity $2^n$ is discarded, or to add t to the accumulator while discarding the carry word.

This method may be implemented by a computer using the memory thereof, as well as the registers, to obtain the desired results. Alternately, specific configurations may be provided for various registers to implement the method.

It should also be recognized that the above concepts are applicable to situations wherein the modulus is $2^m+1$ or $2^m-1$, $m \leq n$ as previously described. For these cases, n−m bits of the data words are disabled and decrementing or incrementing of the accumulator proceeds as described.

For the case where a residue is to be taken modulo $2^n + 1$ and the count, or contents of the carry register, are subtracted from the accumulator, existence of particular boundary conditions may be determined in order to determine a more simplified approach to be taken. Thus, where C represents the value of the contents of the carry register and A represents the value of the contents of the accumulator register, if $C \leq A$ the subtraction of C from A may proceed without difficulty. For a condition wherein C=A, subtraction is unnecessary since the result will be zero.

Under these conditions, C may be subtracted from A or both C and A may be decremented until C=0. In both approaches, A is decremented, whether by one count at a time or by subtracting therefrom the entire value of C.

Where $C=A+1$, the modulo $2^n+1$ residue will be $2^n$ and will exceed the storage capacity of A by 1. Thus, only in this case, it will be necessary to use an additional bit to represent the residue. A preferable approach is to use one bit of the carry register. This may be done by subtracting C−1 from A upon determining that $C=A+1$ and using as the residue the number formed by a 1 in the least significant bit position of C together with the all-zero number in A. Alternatively, both the accumulator and carry registers may be decremented until C=0. For the boundary condition wherein $C=A+1$, an underflow (decrementing the accumulator from a zero content) will be noted in A at that point. Upon noting the underflow, the accumulator is incremented. If the incremented value of A is zero, then the above boundary condition ($C=A+1$) is in force, and C is incremented (to 0 . . . 01), the residue being formed by the number C,A (C concatenated with A).

For situations wherein $C=A+T$, where $T>1$, the residue will be $(T)(2^n)$. Although this residue may be obtained by subtracting A from C, or by decrementing both A and C until $A=0$ and taking the result from the carry register, the following approach is preferred for reasons of uniformity of operation with the preceding conditions. Both the accumulator and carry registers are repeatedly decremented until $C=0$. At that point, A is incremented and the desired residue is in A. Alternatively, $C-1$ is subtracted from both the carry and accumulator registers and the residue found in A.

A memory based microprocessor implementation of the above is shown in FIG. 1, including a microprocessor 10, a read-only memory (ROM) 12 and a read-write memory (RAM) 14. The three devices are connected via an address bus 16 and a data bus 18. Address bus 16 is used for selection of ROM and RAM memory locations. The number of address lines is inconsequential, so long as the number exceeds a reasonable number such as seven. Data bus 18 is used to move data to and from microprocessor 10. The number of lines in data bus 18 should equal the word length of the microprocessor (commonly 2, 4, 8 or 16). A somewhat different procedure may be required for other word lengths, such as 32.

RAM 14 contains multiplication and exponentiation operands and stores results of the multiplications and exponentiation operations. Microprocessor 10 includes a typical arrangement of an accumulator 20, a carry register 22 and a multiplier 24. The microprocessor program, corresponding to a flow chart shown in FIG. 4 or FIGS. 5A and 5B and described hereinbelow, is stored in ROM 12 and executed under control of an instruction control register 25.

In FIG. 2 there is shown a register based implementation of the invention, utilizing a number of registers interconnected to arithmetic functional units. Specifically, a multiplier 26 is shown as operating on operands provided by accumulator and multiplicand registers 28 and 30, respectively. The product of the multiplication is provided by the multiplier 26 to the accumulator register 28 and to a carry register 32. A comparator 34 is used for testing the contents C and A of carry and accumulator registers 32 and 28 and a subtractor 36 modifies the contents of registers 32 and 28 as above described, depending on the results of the comparison test performed by comparator 34.

A similar implementation is shown in FIG. 3. However, the functions performed by the comparator 34 and subtractor 36 are performed by incrementers, decrementers and zero test circuits. Thus, as in the embodiment of FIG. 2, multiplier 26 operates on operands provided by accumulator and multiplicand registers 28 and 30. The product of the multiplication is provided by the multiplier 26 to the accumulator register 28 and to the carry register 32.

A decrementor 38 decrements the carry and accumulator registers in step. A first zero tester 40 tests the contents of carry register 32 for zero. An underflow tester 42 detects underflow of the accumulator during the decrements caused by decrementor 38. Upon detection of an underflow, a signal generated by underflow tester 42 causes an incrementor 44 to increment the contents of the accumulator, once. A second zero tester 46 tests the contents of the accumulator to determine whether incrementing thereof results in zero. Upon a determination that the accumulator has incremented to zero, the second zero tester 46 outputs a signal to incrementor 44 which, responsively thereto, increments carry register 32.

As has been previously described herein the inventive method and apparatus are applicable for obtaining a modulo representation of a result of any computation, although most interest is in exponentiation or multiplication. Application of the inventive concept to multiplication has been described above. Application to exponentiation may be understood with the aid of flow charts illustrating operation of a programmed microprocessor carrying out the inventive method.

Preferably, to obtain a unique transformation, a prime number is used as a modulus for obtaining the residue of products of multiplications. However, for exponentiation, primitive numbers (capable of producing any number 1, 2, . . . , $2^k$) are necessary for the exponentiation base (number to be exponentiated).

It is to be understood that, with respect to exponentiation, several transformation types are available. For example, one form of an exponentiation transformation is the provision of a function $y=c^x$, where c is a constant. Alternatively, the function may be $y=x^c$ or $y=cx^x$ (self exponentiation). In each case, exponentiation to an integer power may be accomplished by successive fast-exponentiation operations.

The process performed by the flow chart of FIG. 4 represents an exponentiation of the type $m^x(\mod 2^n+1)$. In the flow chart, C represents the contents of the carry register, A the contents of the accumulator register, C' the next carry register contents, and A' the next accumulator register contents.

As shown in the flow chart of the Figure, the contents of the carry register C are tested. The presence of a carry is indicative that a modulo operation will take place against $2^n$ upon discarding the carry register. Thus, one is subtracted from the accumulator for each $2^n+$ in the carry register, where the "+" indicates that $2^n$ must be exceeded.

More specifically, at step 50 a count is set to the exponent x and the accumulator contents are set to the constant m. At step 52 the count is decremented by 1 and is tested for equalling zero at step 54. If the result of the test of step 54 is affirmative, the exponentiation is complete and the answer is thus in the accumulator register (and, for the special case previously described, in the carry register).

If the answer to step 54 is negative, the accumulator is tested for zero contents at step 56. Upon a negative answer, the product of A*m (e.g., for the first iteration of the method, $m^2$) is placed at step 58 in the carry and accumulator registers as the next contents thereof, C' and A'. The relationship between the contents of the carry and accumulator registers is tested in step 60 and, if the carry register contents are no greater than the accumulator, the carry register is subtracted from the accumulator at step 62 and the carry discarded at step 64, thus providing a modulo representation of an interim exponential value. Control returns to step 52 where the exponent count is decremented once again and the result tested to determine whether exponentiation has been carried out the required number of times.

As a result of performing step 60, if the value of the contents of the carry register exceeds the value of the contents of the accumulator, it is determined at step 66 whether the special "boundary condition" $C=A+1$ pertains. If yes, step 68 is performed wherein the accumulator is decremented by $C-1$ and, at step 70, the next value of the carry register is set to 1 as previously described.

If the carry register exceeds the accumulator register by a value greater than one, the result of the test at step 66 is negative and processing proceeds to step 72. In this instance, A is again decremented by $C-1$ but, instead of setting the carry register to one (for the special case), the carry register is cleared at step 64. Control again returns to step 52, for another iteration of the procedure.

To handle the boundary situation wherein $C=A+1$, if the contents of the accumulator are found to equal zero, upon each iteration the contents of the carry register are tested against unity at a step 74. If the result of the test at step 74 is negative, processing continues. If the results are affirmative, step 76 is performed, wherein the next value of the accumulator is set to zero and the value of the carry register is set to M, returning control to step 60 to continue the process.

Figures 5A, 5B:
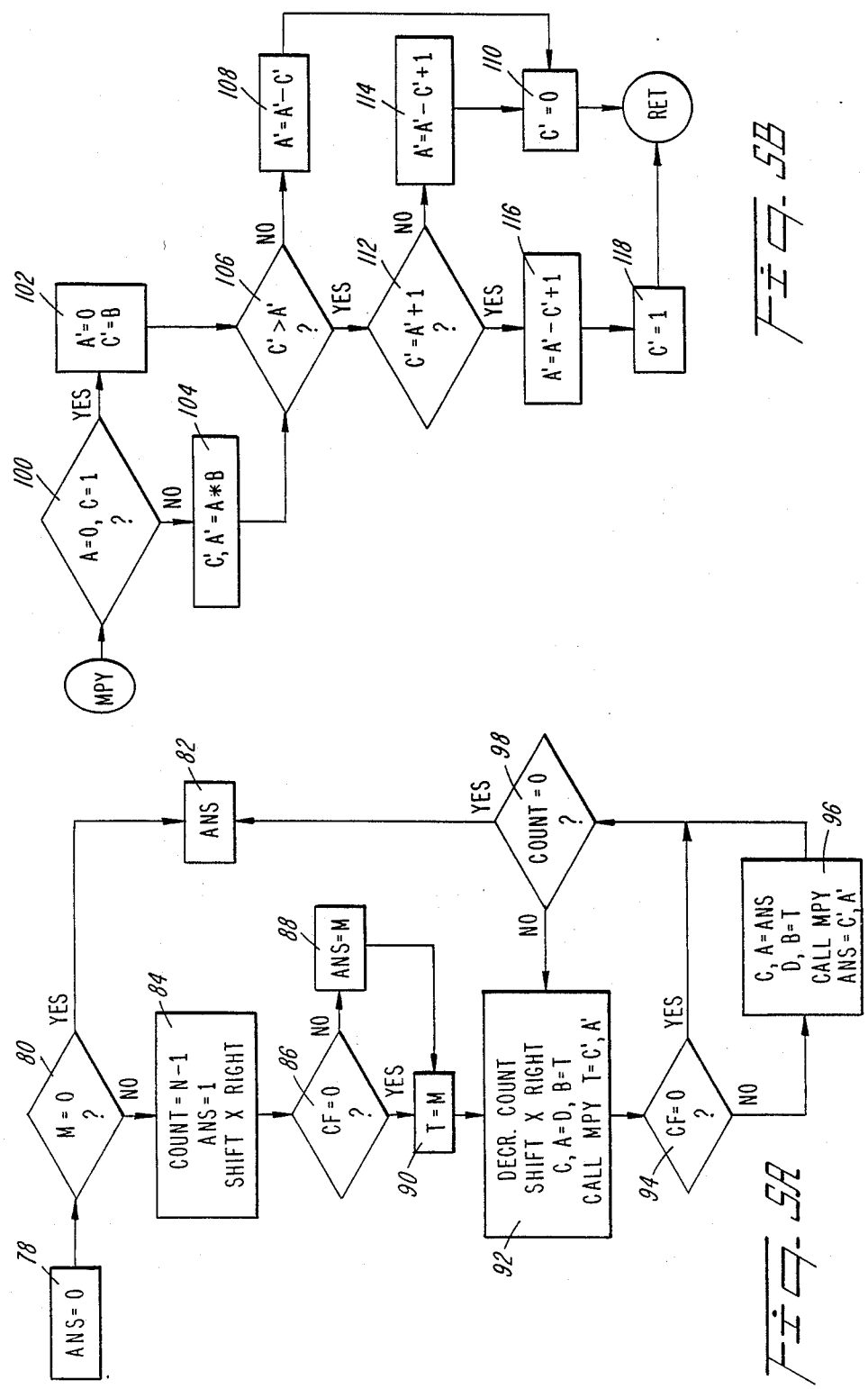
FIGS. 5A and 5B are a flow chart illustrating an alternate embodiment of the invention.

Referring now to the flow chart of FIGS. 5A and 5B, there is described an alternate approach to encryption or similar operation of a programmed microprocessor to obtain a modulo representation of an exponentiation. In the flow chart of FIGS. 5A and 5B, as in FIG. 4, C represents the contents of the carry register, A the contents of the accumulator register, C' the next carry register contents, A' the next accumulator register contents and CF a carry flag.

The alternate embodiment of the invention also provides the desired transformation by modulo representation of an exponentiation. However, in the embodiment of FIG. 5A the transformation is performed by application of a fast exponentiation routine using the multiplication routine shown in FIG. 5B. In the alternate embodiment of FIGS. 5A and 5B, it will be appreciated that short cut paths are provided to account for multiplication by 0 and by $2^n$.

The first step (step 78) in the exponentiation routine illustrated in FIG. 5A initializes the answer (result of the exponentiation) to 0 in case no further operations are necessary. The test at step 80 assures that if the number to be exponentiated is 0, the preset answer is delivered (step 82). If the test at step 80 reveals a nonzero number, the answer is initialized to 1, a count one less than the processor word length is set, and the exponent x is shifted right (step 84). The purpose of setting the answer to 1 is to provide an initial operand for subsequent multiplications. The purpose of setting the count is to establish how many bits of the exponent must be processed, and the purpose of the right shift is to place the least significant bit of the exponent in a testable position (carry flag). Step 86 tests the carry flag (least significant bit of the exponent), and updates the answer to m if the carry flag is 1 (step 88). Step 90 initializes a temporary storage location for powers of 2 exponents of m. In step 92, the count is decremented, the next bit of the exponent is shifted out for testing and T is loaded into two operand pairs (C,A and D,B) in preparation for squaring. Step 94 checks CF to determine whether or not the answer is to be updated. If $CF=1$, the update takes place by multiplying the answer by T and storing the result as the new answer (step 96). The count is checked (step 98) to determine whether all bits of the exponent have been processed. If so (count=0), the answer is available. If not, the routine at step 92 is repeated.

The multiply routine in FIG. 5B is similar to the multiplication portion of FIG. 4. At step 100, the condition for multiplication by the processor word length power of 2 is checked. If the condition is met, the accumulator is cleared and the B operand is placed in the carry register (step 102). If not, ordinary multiplication takes place (step 104). Step 106 determines which side of the boundary condition the result meets. If C' is not greater than A', C' is subtracted from A' (step 108) and zeroed (step 110). If C' is greater than A', step 112 checks for the condition of 1 greater. In either case, $C'-1$ is subtracted from A'. If C' is not 1 greater than A', this is done in step 114 which leads to $C'=0$; if C' is greater than A', this is done in step 116 which leads to $C'=1$ (step 118). The answer is retained as C',A'.

Accordingly, the flow charts of FIGS. 4, 5A and 5B illustrate methods for operating a computer, for example, to implement the present invention.

The concepts utilized in the inventive method may be chained. Chaining involves feeding all or part of the results of one block transformation into another block transformation. Chaining has been previously used in encryption applications in order to make cryptoanalysis more difficult, for example. However, in the present invention chaining is newly applied to one-way transformations. Two ways in which chaining may be used in one-way transformations are illustrated in FIGS. 6A and 6B.

Figure 6A:
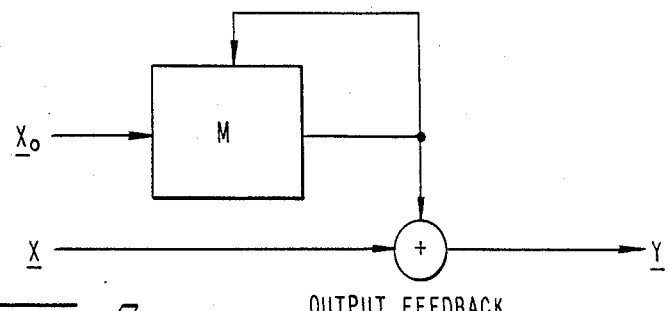
FIGS. 6A and 6B illustrate application of chaining to the one-way transformation of the present invention.
Figure 6B:
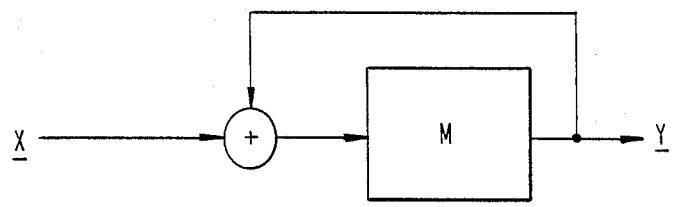

In the arrangement shown in FIG. 6A there is provided an "output feedback" form of chaining. Such feedback is accomplished similarly to encryption output feedback. In the following, the generic description $y=m^*(x)$ is used to describe a composite transformation, and $y_1=m(x_1)$, $y_2=m(x_2)$, etc. is used to describe the block transformations tailored to the processor word length.

From FIG. 6A it will be appreciated that an initiation quantity, $x_o$, is necessary to start the process. The equations describing the output feedback type of chaining are:

$$y=m^*(x),$$

where
$y=(y_1, y_2, \ldots y_p),$
$x=(x_1, x_2, \ldots x_p),$
and $$y_1 = m(x_o) + x_1,$$

$$y_2 = m^2(x_o) + x_2, \ldots$$

$$y_p = m^p(x_o) + x_p.$$

In a transform feedback arrangement, as shown in FIG. 6B, the feedback is accomplished in essentially the same manner as for cipher block chaining and cipher feedback. There are several ways in which an initialization quantity may be used. The method shown in FIG. 6B does not require initialization. The transformation equations for the arrangement of FIG. 6B are:

$$y=m^*(x),$$

where
$y = (y_1, y_2, \ldots y_p)$,
$x = (x_1, x_2, \ldots x_p)$,
and $$y^1 = m(x_1),$$

$$y_2 = m^2(x_1) + m(x_2), \ldots$$

$$y_p = m^p(x_1) + m^{p-1}(x_2) + \ldots + m(x_p).$$

An additional vector z may be appropriate to control statistical properties of these (exponentiation, self-exponentiation, and chained) transforms (for example by bit-by-bit exclusive-or addition of the components of y and z as y+z).

Figure 7:
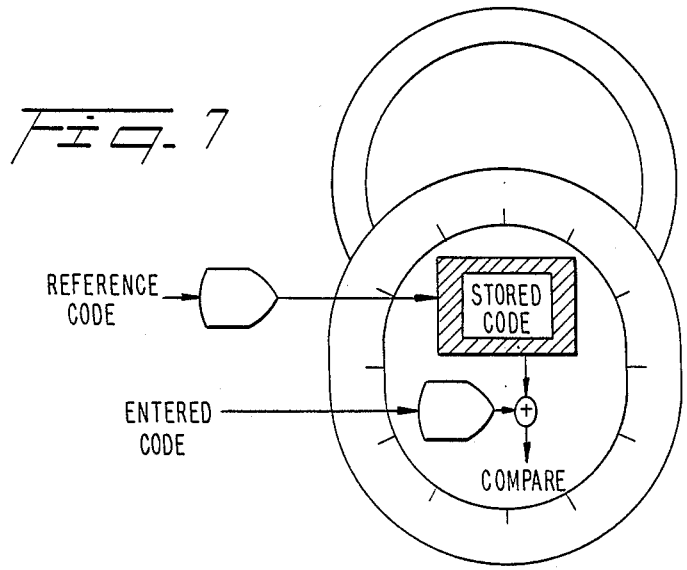
FIG. 7 shows an application of the inventive concept to encryption and to key-protection.

The present invention, as above described, may be used for protection of security (use-control) keys. Some systems, such as weapon systems, for example, depend on encryption. In such systems, it is important that encryption key information not be readily obtainable by an adversary. While early systems depended on mechanical packaging to hinder unauthorized use, the one-way transforms herein described may be used. An application of one-way transforms to the encryption and/or key protection process is shown in FIG. 7.

Conceptually, either key-dependent encryption or keyless one-way transformations, which depend on computational complexity, may be used. The use of one-way transformations allows the comparison of transformed keys without the necessity of computing the clear-text keys.

There is a further potential need to protect processor instructions embedded in weapon firmware from tampering or from alterations due to natural events. In order not to allow the replacement of a program with one which was changed in some crucial hard-to-detect fashion, preventive measures may be taken utilizing the inventive techniques.

Figure 8:
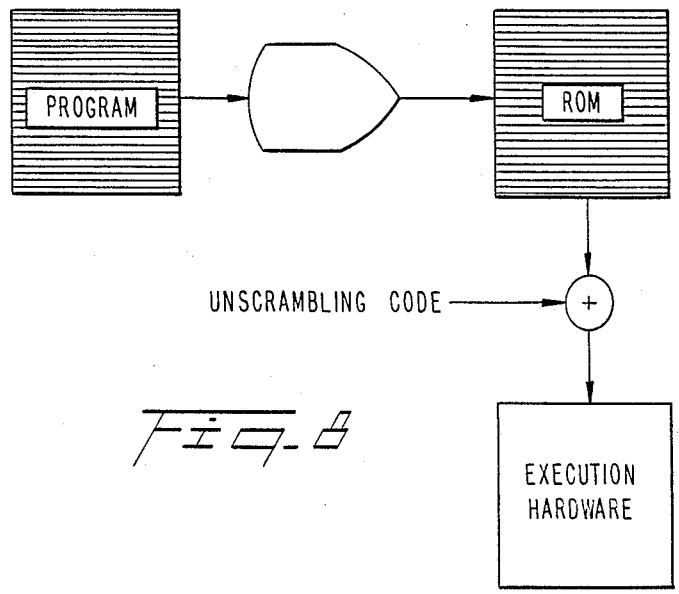
FIG. 8 illustrates the use of the inventive concepts for encryption.

The use of one-way transforms or encryption to protect processor instructions is illustrated in FIG. 8. Therein, the program instructions are embedded as firmware in encrypted code. An adversary surreptitiously attempting to alter instructions or instruction parameters is afforded no usable information. Of course, the adversary could completely destroy the program, although such an attempt could be easily detected. However, intelligent changes are prevented. In the configuration of FIG. 8, a secret transformation or encryption key is necessary (in the absence of a secret authenticity check) in order to prevent a complete program from being entered by the adversary. In an asymmetric cryptosystem (such as RSA encryption), the decryption key or second one-wa transform need not be protected. Therefore, asymmetric encryption or transformation allows the development of processing hardware and software without protection restrictions except for the initial program transformation or encryption.

Natural events may be protected against by standard techniques such as error-protection codes and unprotected message authenticity checks. Both of these methods are one-way transformations. Protection against an intelligent adversary requires more robust protection (key-dependent encryption and/or secret authenticity checks for example).

Figure 9:
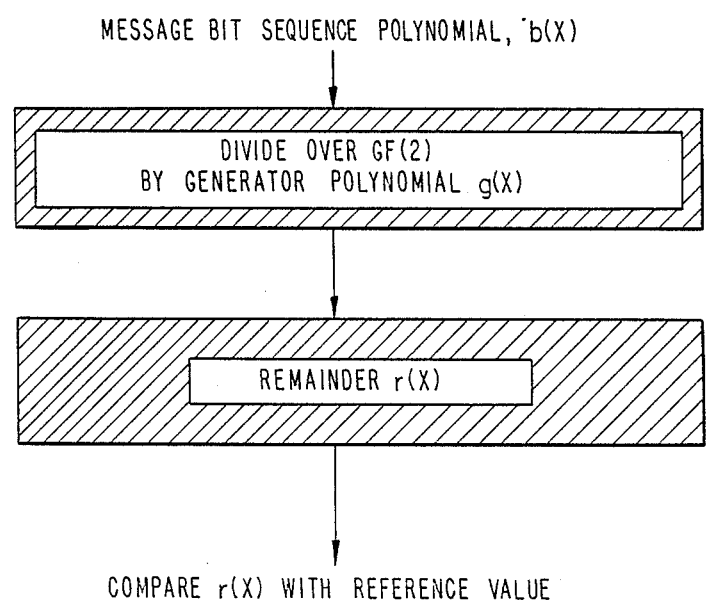
FIG. 9 shows the concept of secret authenticity checking utilizing the invention.

Referring now to FIG. 9, there is shown yet additional protection against tampering, utilizing a secret authenticity check, which can also incorporate the concepts of the present invention. Transformations similar to those used by financial institutions are appropriate for this application, as are the multiplication and exponentiation transformations previously described.

The foregoing description of the preferred embodiments of the invention has been presented for purposes of illustration and description and is not intended to be exhaustive or to limit the invention to the precise forms disclosed, since many modifications and variations are possible in light of the above teaching. The embodiments were chosen and described in order best to explain the principles of the invention and its practical application, thereby to enable others skilled in the art best to utilize the invention in various embodiments and with various modifications as are suited to the particular use contemplated therefor. It is intended that the scope of the invention be defined by the claims appended hereto, when interpreted in accordance with full breadth to which they are legally and equitably entitled.

I claim:

1. A method for one-way transformation of data to generate an encrypted form thereof by obtaining a modulo-k representation of a product of at least first and second numbers in an n-bit computer where $2^n \neq k$, said computer having a multiplying apparatus including an n-bit accumulator register and an n-bit carry register, comprising the steps of:

inputting a first number G from an input source to the computer, obtaining a second number H, using said multiplying apparatus to obtain a product $J = G*H$, storing said product in said accumulator and carry registers, transforming the product to obtain a unique one-way encrypted transform thereof, said transforming step comprising the step of obtaining a modulo-k representation, $J_k = (G*H) \bmod k$, of the product by performing the further steps of:

comparing the contents of said accumulator and carry registers to determine a relation therebetween, selecting a function dependent on the results of said comparing step, applying the selected function to the contents of said carry register, generating signals representative of the selected function of the contents of said carry register, transferring said generated signals to the accumulator register, altering said accumulator register in response to said signals transferred thereto, generating signals representative of the altered contents of said accumulator register and outputting said signals representative of the altered contents of said accumulator register as the transformed representation $J_k$.

2. A method as recited in claim 1 wherein said number k differs by an integer d from a power of two, $2^p$, and comprising the further step of disabling n-p bits of said accumulator and carry registers, if n>p.

3. A method as recited in claim 2 wherein said number k is greater than said power of 2 by said integer d, said selecting step comprises selecting a decrementing function and said altering step comprises the step of decrementing said accumulator and carry registers until the contents of said carry register are zero, thereby subtracting the contents of said carry register from the contents of said accumulator register.

4. A method as recited in claim 2 wherein n=p, said number k is a prime number one more than $2^n$, said comparing step comprises the step of comparing the contents of said accumulator and carry registers to determine which register contains a larger number, and said selecting and generating steps comprise the step of generating signals representative of the contents of said carry register if the contents of said accumulator register are greater than or equal to the contents of said carry register.

5. A method as recited in claim 4 wherein said selecting and generating steps comprise the step of generating signals representative of a number one less than the contents of said carry register if the contents of said carry register are greater than or equal to one more than the contents of said accumulator register, and wherein said altering step comprises the step of decrementing said accumulator register thereby subtracting one less than the contents of said carry register from the contents of said accumulator register.

6. A method as recited in claim 2 wherein said number k is less than said power of 2 by said integer d, said selecting step comprises selecting a combined incrementing and decrementing function, and said altering step comprises the step of incrementing said accumulator register while decrementing said carry register until the contents of said carry register are zero, thereby adding the contents of said carry register to the contents of said accumulator register.

7. A method as recited in claim 6 wherein p=n−t, t an integer, said number k is a prime number one less than $2^p$, and said comparing step comprises the step of comparing the contents of said accumulator and carry registers to determine whether a sum of said contents is or is not less than k and, if the sum is not less than k, incrementing said accumulator register upon noting an overflow when the contents of said carry register are zero.

8. A method as recited in claim 1 wherein said step of using said multiplying apparatus to obtain a product comprises the step of obtaining an exponential product of at least said first and second numbers.

9. A method for encrypting data by obtaining a truncated modulo-k representation of an exponential product of first and second numbers in an n-bit computer where $2^n \neq k$, said computer having a multiplying apparatus including an n-bit accumulator register and an n-bit carry register, comprising the steps of:

inputting a first number G from an input source to the computer, obtaining a second number H, using said multiplying apparatus to obtain an exponential product $J=G^H$ of said first and second numbers, storing a truncated portion of said exponential product in said accumulator and carry registers, transforming the exponential product to obtain a unique one-way encrypted transform thereof, said transforming step comprising the step of obtaining a modulo-k representation, $J_k=(G^H) \bmod k$, of the exponential product by performing the further steps of:

comparing the contents of said accumulator and carry registers to determine a relation therebetween, selecting a function dependent on the results of said comparing step, applying the selected function to the contents of said carry register, generating signals representative of the selected function of the contents of said carry register, transferring said generated signals to the accumulator register, altering said accumulator register in response to said signals transferred thereto, generating signals representative of the altered contents of said accumulator register and outputting said signals representative of the altered contents of said accumulator register as the transformed representation $J_k$.

10. A method as recited in claim 9 wherein said number k differs by an integer d from a power of two, $2^p$, and comprising the further step of disabling n−p bits of said accumulator and carry registers when n>p.

11. A method as recited in claim 10 wherein said number k is greater than said power of 2 by said integer d, said selecting step comprises selecting a decrementing function, and said altering step comprises the step of decrementing said accumulator and carry registers until the contents of said carry register are zero, thereby subtracting the contents of said carry register from the contents of said accumulator register.

12. A method as recited in claim 10 wherein n=p, said number k is a prime number one more than $2^n$, said comparing step comprises the step of comparing the contents of said accumulator and carry registers to determine which register contains a larger number, and said selecting and generating steps comprise the step of generating signals representative of the contents of said carry register if the contents of said accumulator register are greater than or equal to the contents of said carry register.

13. A method as recited in claim 12 wherein said selecting and generating steps comprise the step of generating signals representative of a number one less than the contents of said carry register if the contents of said carry register are greater than or equal to one more than the contents of said accumulator register, and wherein said altering step comprises the step of decrementing said accumulator register thereby subtracting one less than the contents of said carry register from the contents of said accumulator register.

14. A method as recited in claim 10 wherein said number k is less than said power of 2 by said integer d, said selecting step comprises selecting a combined incrementing and decrementing function, and said altering step comprises the step of incrementing said accumulator register while decrementing said carry register until the contents of said carry register are zero, thereby adding the contents of said carry register to the contents of said accumulator register.

15. A method as recited in claim 14 wherein p=n−t, t an integer, said number k is a prime number one less than $2^p$, and said comparing step comprises the step of comparing the contents of said accumulator and carry registers to determine whether a sum of said contents is or is not less than k and, if the sum is not less than k, incrementing said accumulator register upon noting an overflow when the contents of said carry register are zero.

16. Apparatus for one-way transformation of data to generate an encrypted form thereof as a modulo-k representation of a product of first and second numbers in an n-bit computer means where $2^n \neq k$ and k differs by an integer d from a power of two $2^p$, $p \leq n$, said computer means having a multiplying apparatus, an n-bit accumulator register and an n-bit carry register, comprising:

means for inputting first and second numbers G and H to said multiplying apparatus to obtain a truncated product J=G*H in said accumulator and carry registers, said computer means including modulo residue generating means for obtaining a modulo-k representation, $J_k = (G*H) \mod k$, of the product, including:

comparing means for comparing the contents of said accumulator and carry registers to determine a relation therebetween, altering means for altering the contents of said accumulator register in response to the contents of said carry register according to the relation determined between the contents of said accumulator and carry registers, signal generating means for generating signals representative of the altered contents of said accumulator register and outputting means for outputting said signals representative of the altered contents of said accumulator register as the modulo-k representation $J_k$.

17. Apparatus as recited in claim 16 further comprising selecting means for selecting a function dependent on the relation determined by said comparing means, applying means for applying the selected function to the contents of said carry register, second signal generating means for generating signals representative of the selected function of the contents of said carry register, and transferring means for transferring said generated signals to the accumulator register.

18. Apparatus as recited in claim 17 wherein said number k is greater than said power of 2 by said integer d, said selecting means being operable for selecting a decrementing function, and said altering means comprises decrementing means for decrementing said accumulator and carry registers until the contents of said carry register are zero, thereby subtracting the contents of said carry register from the contents of said accumulator register.

19. Apparatus as recited in claim 17 wherein n=p, said number k is a prime number one more than $2^n$, said comparing means comprises means for comparing the contents of said accumulator and carry registers to determine which register contains a larger number, and said second signal generating means is operable for generating signals representative of the contents of said carry register if the contents of said accumulator register are greater than or equal to the contents of said carry register.

20. Apparatus as recited in claim 19 wherein said second generating means is further operable for generating signals representative of a number one less than the contents of said carry register if the contents of said carry register are greater than or equal to one more than the contents of said accumulator register, and wherein said altering means comprises decrementing means for decrementing said accumulator register thereby subtracting one less than the contents of said carry register from the contents of said accumulator register.

21. Apparatus as recited in claim 17 wherein said number k is less than said power of 2 by said integer d, said selecting means being operable for selecting a combined incrementing and decrementing function, and wherein said altering means comprises means for incrementing said accumulator register while decrementing said carry register until the contents of said carry register are zero, thereby adding the contents of said carry register to the contents of said accumulator register.

22. Apparatus as recited in claim 21 wherein p=n−t, t an integer, said number k is a prime number one less than $2^p$, and said comparing means comprises means for comparing the contents of said accumulator and carry registers to determine whether a sum of said contents is or is not less than k and, if the sum is not less than k, for incrementing said accumulator register upon noting an overflow when the contents of said carry register are zero.

* * * * *